J. E. Nesen,
Harvester Cutter.
No. 999
Reissued. July. 3. 1860.
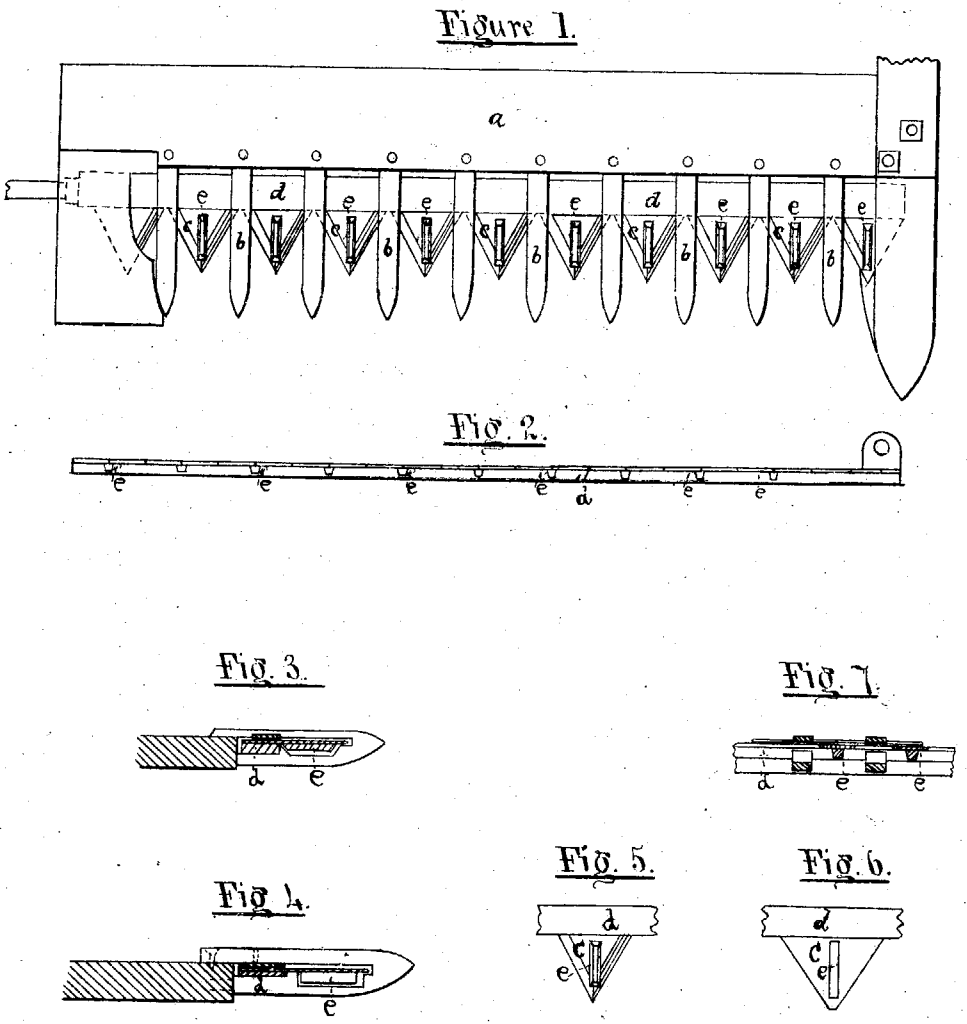

UNITED STATES PATENT OFFICE.

H. BALDWIN, JR., OF WASHINGTON, DISTRICT OF COLUMBIA, ASSIGNEE OF J. E. NESEN, OF BUFFALO, NEW YORK.

IMPROVEMENT IN HARVESTERS AND BINDERS.

Specification forming part of Letters Patent No. 10,314, dated August 27, 1853; Reissue No. 999, dated July 3, 1860.

DIVISION B.

*To all whom it may concern:*

Be it known that JOSEPH E. NESEN, of Buffalo, in the county of Erie and State of New York, invented certain new and useful Improvements in the Cutting Apparatus of Harvesters and Binders, of which the following is a full, clear, and exact description, reference being had to the annexed drawings, making a part of this specification, in which—

Figure 1 is a view of the under side of the cutting apparatus. Fig. 2 is a front view of the cutter, which is of the kind known as a "scalloped cutter." Fig. 3 is a side view of one of the fingers and a section of the cutter when the projection on the blade is so arranged that its inner edge vibrates in close proximity to a shoulder in the slot in the finger. Fig. 4 is a similar view when the shape of the projection on the blade and the slot in the finger differs slightly from that shown in Fig. 3. Fig. 5 is a view of the under side of the cutter-blade represented in section in Fig. 3. Fig. 6 is a similar view of the cutter-blade represented in section in Fig. 4. Fig. 7 is a section taken parallel to the finger-beam through two fingers and two blades of the cutter.

The improvement specified in this patent consists in constructing the cutting apparatus of a reaping and mowing machine in such manner as to increase the vertical stiffness and strength of the scalloped blade of the cutter, and by projections on the blade, vibrating through suitably-shaped slots in the fingers, to prevent the cutting apparatus from becoming clogged or choked. The manner in which this improvement accomplishes these results is shown in the following description.

In the drawings, *c* represents sections of the blade of the cutter, *d* the cutter-bar, and *b* the fingers fastened to the finger-beam *a*. Each section *c* of the cutter has a projecting rib, *e*, or its equivalent, so arranged as to give vertical stiffness and strength, which a perfectly flat thin plate would not have, but is accomplished by any change in the cross-section of the cutter that increases the vertical distance between the extreme upper and lower surfaces of the section. The slot in the finger is of such shape as to allow of the passage of this projection on the blade, which is so arranged as to push out and remove from the slot straw or fibers, which if not removed would clog the cutting apparatus. The projection on the blade is so shaped as to present angular edges, which in certain cases may be made to vibrate in close proximity to corresponding angular shoulders in the slot, as shown in Fig. 3, to detach by a shearing action and remove from the cutting apparatus clogging matter that could not be removed easily if the angles of the projection and slot were not so arranged that when one is passing the other they would be in close approximation.

What is claimed under this patent as the invention of the said JOSEPH E. NESEN is—

1. Constructing the blade of the cutter of a reaping or mowing machine with a projection or rib, *e*, or its equivalent, for the purpose of strengthening it, substantially as described.

2. The combination of a scalloped cutter, having the projections or ribs *e*, or their equivalents, on its blade, with the slotted fingers through which the blade, with its projections, is arranged to play, substantially in the manner and for the purposes described.

3. The combination of the angular projections or ribs *e*, or their equivalents, on the blade with corresponding angular shoulders in the slot of the finger, substantially as described, the shoulders and projections being so arranged that the angles of one will vibrate past those of the other in such near proximity as to facilitate the detachment and discharge of clogging matter, substantially as described.

In testimony whereof I have hereunto subscribed my name.

HENRY BALDWIN, JR.

Witnesses:

W. RENWICK SMEDBERG,
A. E. H. JOHNSON.